(12) United States Patent
McCarthy et al.

(10) Patent No.: US 8,757,099 B1
(45) Date of Patent: Jun. 24, 2014

(54) VEHICULAR PET PLATFORM ASSEMBLY

(71) Applicants: Susan M. McCarthy, Slatington, PA (US); Michael A. Vilcheck, Slatington, PA (US)

(72) Inventors: Susan M. McCarthy, Slatington, PA (US); Michael A. Vilcheck, Slatington, PA (US)

( * ) Notice: Subject to any disclaimer, the term of this patent is extended or adjusted under 35 U.S.C. 154(b) by 0 days.

(21) Appl. No.: 13/967,007

(22) Filed: Aug. 14, 2013

(51) Int. Cl.
*A01K 1/035* (2006.01)

(52) U.S. Cl.
USPC ............................................. 119/756; 119/771

(58) Field of Classification Search
USPC ............... 119/756, 496, 771, 484, 422, 28.5; 296/1.07, 153
See application file for complete search history.

(56) References Cited

U.S. PATENT DOCUMENTS

| | | | | |
|---|---|---|---|---|
| 1,715,862 A | * | 6/1929 | Payton | 297/411.22 |
| 1,760,450 A | * | 5/1930 | Taylor | 297/411.22 |
| 1,925,523 A | * | 9/1933 | Cuff et al. | 224/482 |
| 2,503,602 A | * | 4/1950 | Titley | 5/94 |
| 2,869,146 A | * | 1/1959 | Allison | 5/118 |
| 3,603,637 A | * | 9/1971 | DePinto | 296/153 |
| 3,857,365 A | * | 12/1974 | Mueller | 119/28.5 |
| 4,057,031 A | * | 11/1977 | Williams et al. | 119/28.5 |
| D249,673 S | * | 9/1978 | Cortez | D12/421 |
| 4,512,286 A | * | 4/1985 | Rux | 119/771 |
| D317,982 S | * | 7/1991 | Morales | D12/420 |
| 5,123,377 A | * | 6/1992 | Edwards | 119/28.5 |
| D329,836 S | | 9/1992 | Meyers | |
| 5,167,202 A | * | 12/1992 | Bradford et al. | 119/452 |
| D340,339 S | * | 10/1993 | Kean et al. | D34/27 |
| D344,867 S | * | 3/1994 | Sutherland | D6/513 |
| 5,351,648 A | * | 10/1994 | Elesh | 119/28.5 |
| 5,509,373 A | * | 4/1996 | Elesh | 119/28.5 |
| D394,733 S | * | 5/1998 | Nowicki | D30/114 |
| 5,785,003 A | * | 7/1998 | Jacobson et al. | 119/496 |
| D414,949 S | * | 10/1999 | Natale | D6/362 |
| 6,000,365 A | | 12/1999 | Charnesky | |
| 6,079,370 A | * | 6/2000 | Al-Birmani et al. | 119/771 |
| 7,077,457 B1 | | 7/2006 | Polette | |
| 8,091,513 B1 | * | 1/2012 | Garcia | 119/771 |
| 2007/0006810 A1 | | 1/2007 | Dawson et al. | |
| 2007/0283898 A1 | | 12/2007 | Madison | |
| 2009/0194035 A1 | | 8/2009 | Cody et al. | |
| 2011/0080015 A1 | | 4/2011 | Spiegel et al. | |

\* cited by examiner

*Primary Examiner* — Yvonne Abbott

(57) ABSTRACT

A vehicular pet platform assembly allows a pet to ride safely within a vehicle while protecting the vehicle's interior from damage by the pet. The assembly includes a platform having a top surface, a bottom surface, a front wall, a rear wall, and a pair of lateral walls attached to and extending between the front and rear walls. The platform is configured to support front legs of a pet. A pair of rigid arms is coupled to and extends outwardly from the rear wall. An inner surface of the arms form a receiving slot configured for positioning onto a vehicle door frame such that each of the arms are positioned within a window cavity of the vehicle and against an inside surface of the vehicle door frame.

20 Claims, 4 Drawing Sheets

VEHICULAR PET PLATFORM ASSEMBLY

FIELD OF THE DISCLOSURE

The disclosure relates to pet platform assemblies and more particularly pertains to a new pet platform assembly for allowing a pet to ride safely within a vehicle while protecting the vehicle's interior from damage by the pet.

SUMMARY OF THE DISCLOSURE

An embodiment of the disclosure meets the needs presented above by generally comprising a platform having a top surface, a bottom surface, a front wall, a rear wall, and a pair of lateral walls attached to and extending between the front and rear walls. The platform is configured to support front legs of a pet. A pair of rigid arms is coupled to and extends outwardly from the rear wall. An inner surface of the arms form a receiving slot configured for positioning onto a vehicle door frame such that each of the arms are positioned within a window cavity of the vehicle and against an inside surface of the vehicle door frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
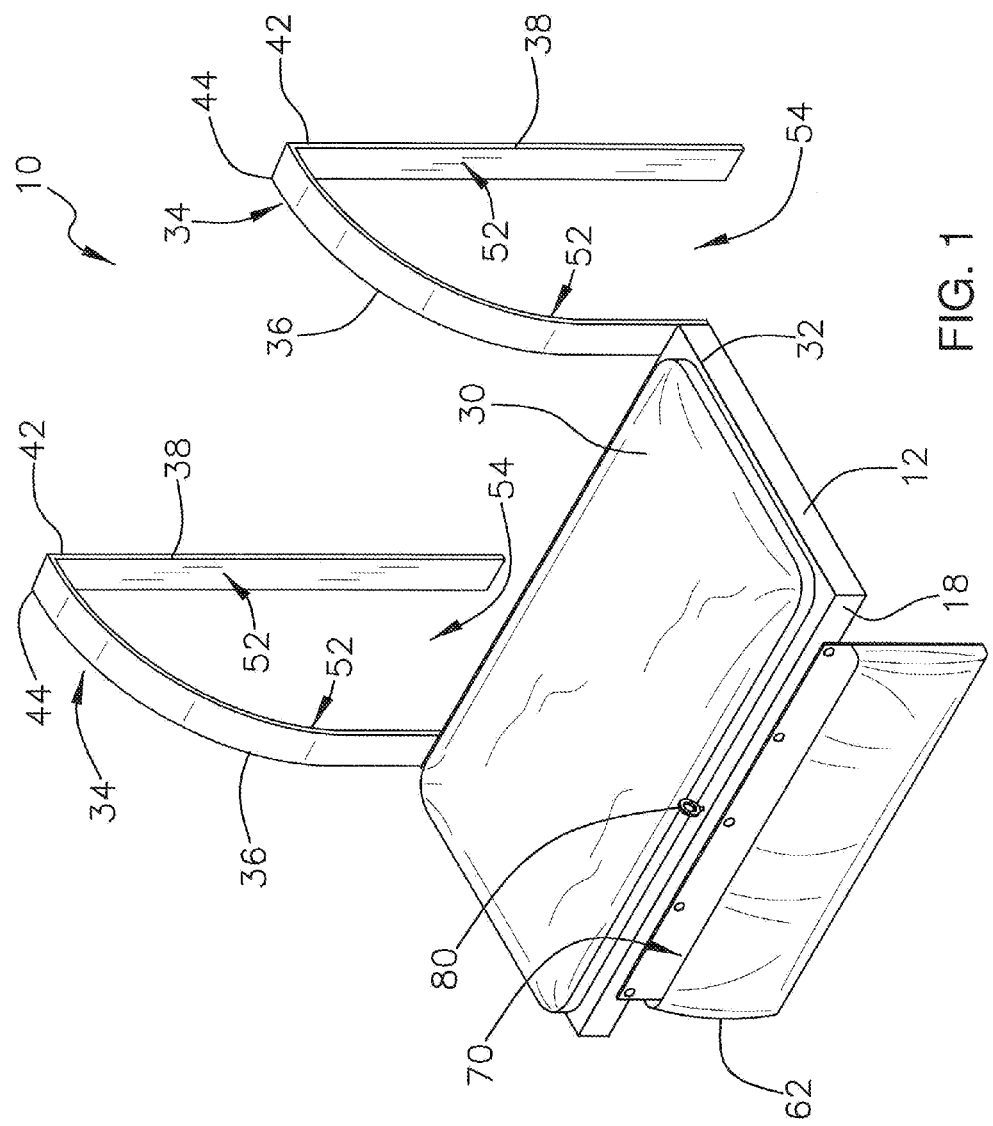
FIG. 1 is a top front side perspective view of a vehicular pet platform assembly according to an embodiment of the disclosure.
Figure 2:
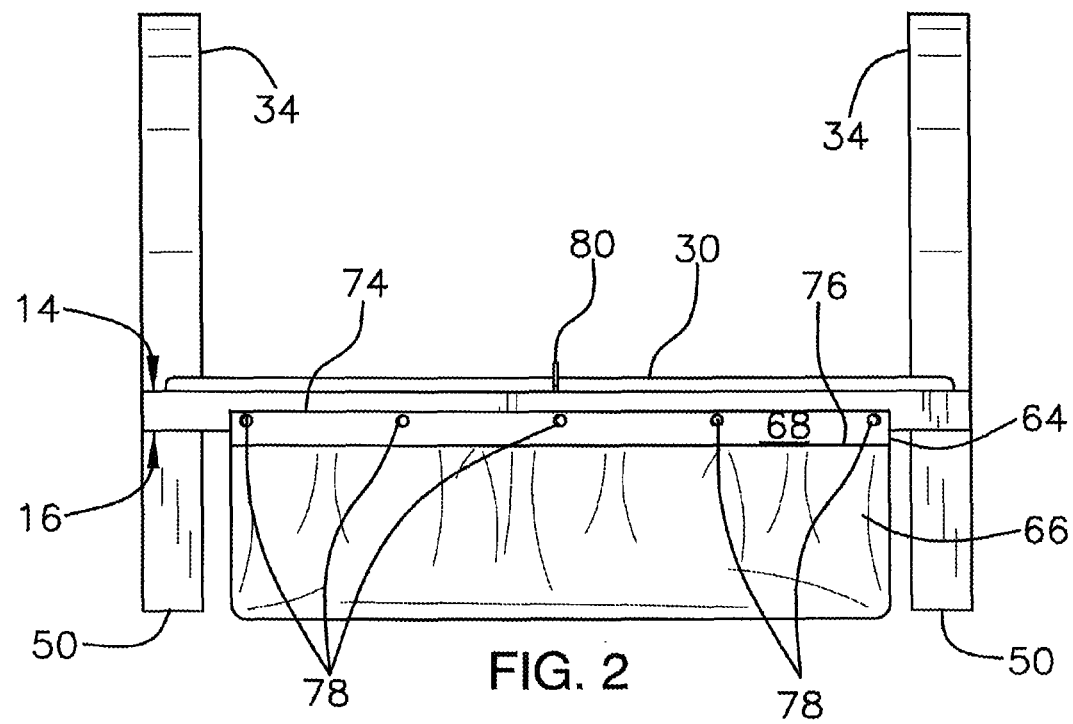
FIG. 2 is a front view of an embodiment of the disclosure.
Figure 3:
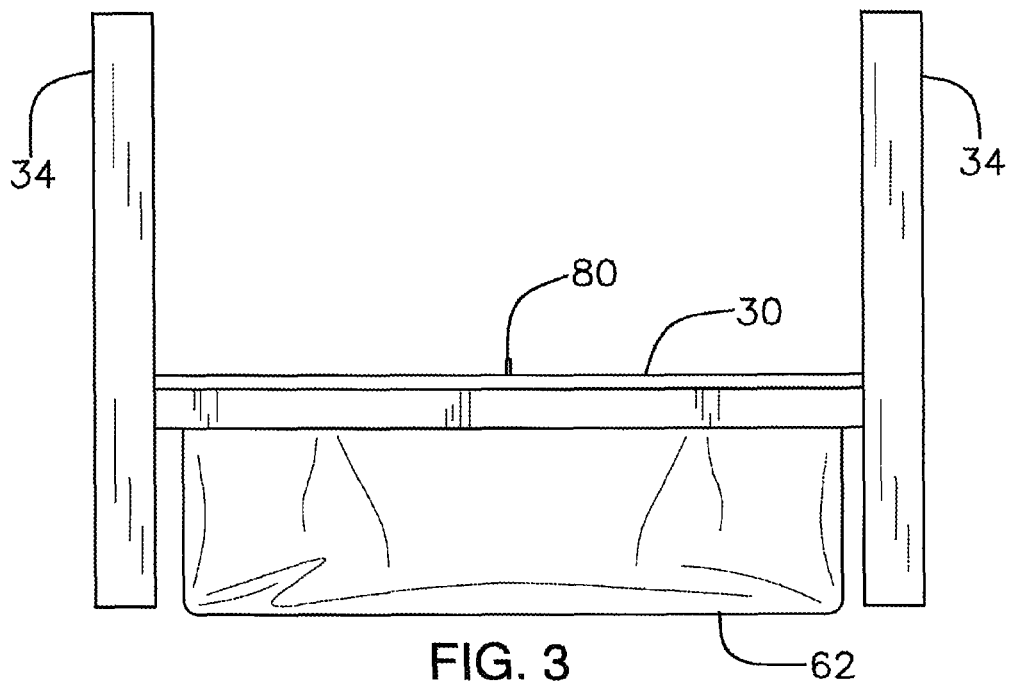
FIG. 3 is a back view of an embodiment of the disclosure.
Figure 4:
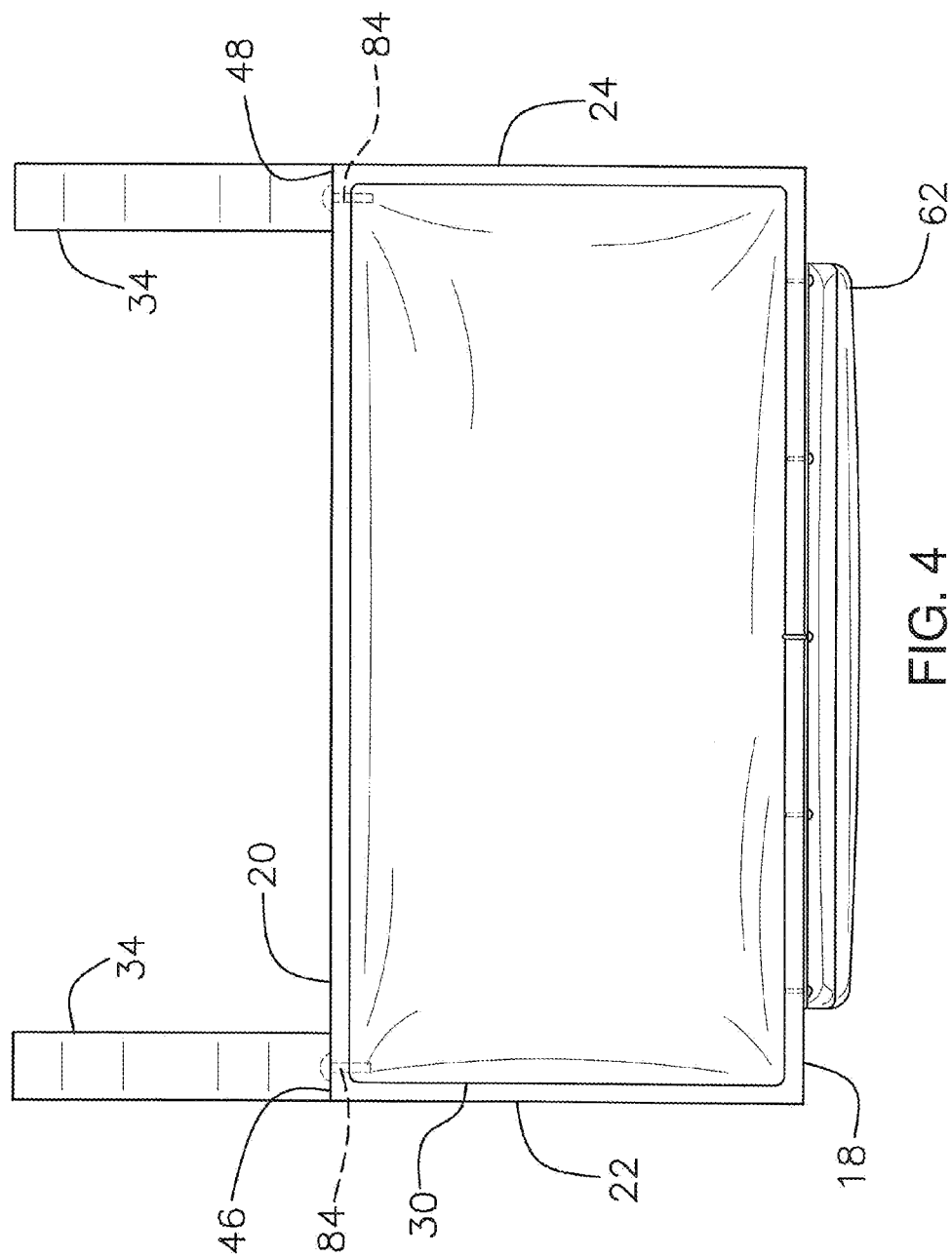
FIG. 4 is a top view of an embodiment of the disclosure.
Figure 5:
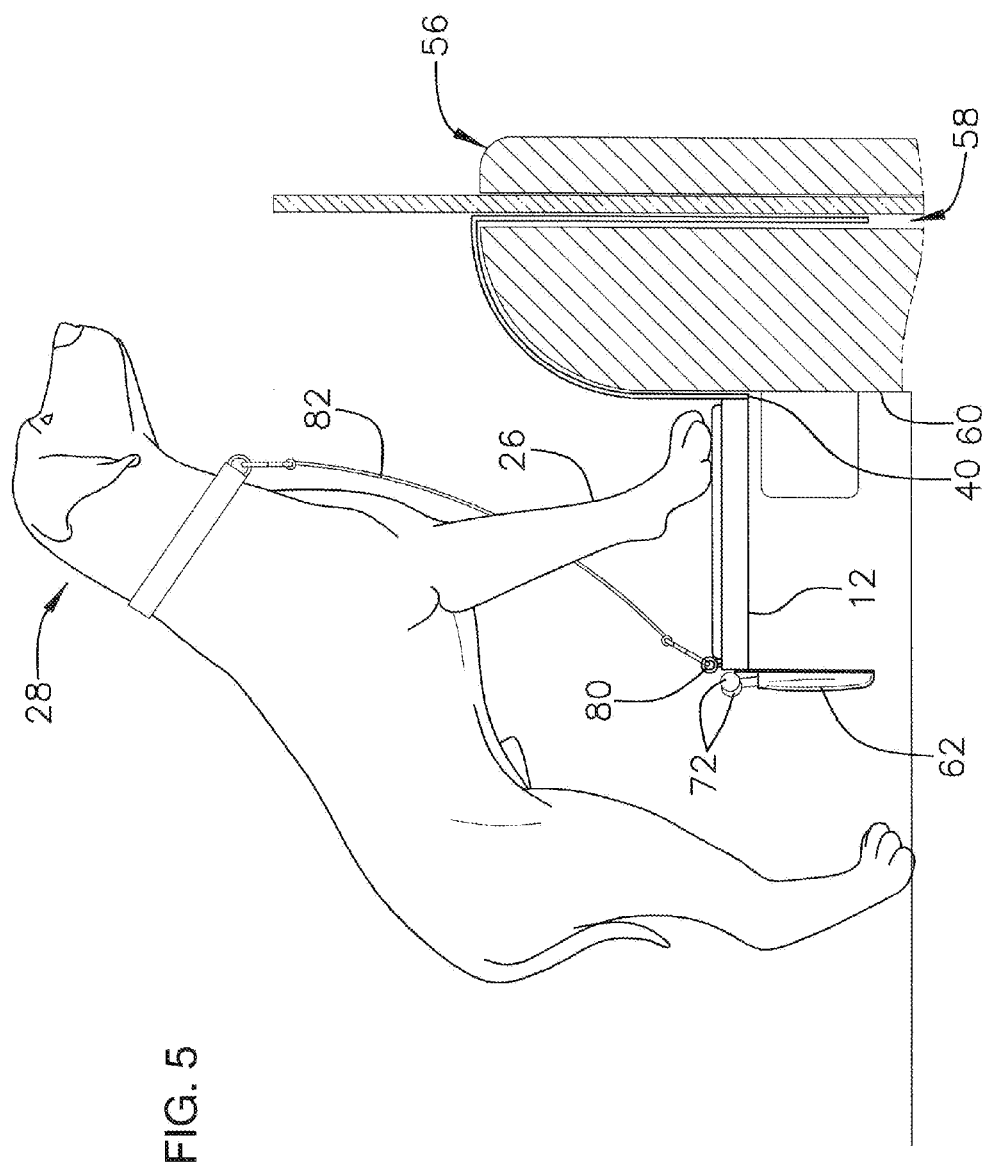
FIG. 5 is an in-use side view of an embodiment of the disclosure.

With reference now to the drawings, and in particular to FIGS. 1 through 5 thereof, a new pet platform assembly embodying the principles and concepts of an embodiment of the disclosure and generally designated by the reference numeral 10 will be described.

As best illustrated in FIGS. 1 through 5, the vehicular pet platform assembly 10 generally comprises a platform 12 having a top surface 14, a bottom surface 16, a front wall 18, a rear wall 20, and a pair of lateral walls 22, 24 attached to and extending between the front 18 and rear 20 walls. The platform 12 is configured to support front legs 26 of a pet 28, such as a dog or the like. The platform 12 may be constructed from plastic or like material. The platform 12 may have a length between approximately 28.0 and 32.0 centimeters and a width between approximately 14.0 centimeters and 16.0 centimeters.

A pad 30 is positionable on the top surface 14. The pad 30 may have a size such that the pad 30 is spaced from a perimeter edge 32 of the top surface 14. The pad 30 may be comprised of an elastomeric foam material, such as memory foam or the like, such that the pad 30 prevents the pet 28 positioned thereon from sliding while riding inside of the vehicle. A top side of the pad 30 may be constructed from plastic, vinyl, or the like. In this manner, the top side of the pad 30 is washable and may prevent the pet 28 from puncturing the pad 30.

A pair of rigid arms 34 may be removably coupled to the rear wall 20. Each of the arms 34 comprises an arcuate first section 36 and a planar second section 38. A bottom end 40 of the first sections 36 may be aligned with the bottom surface 16. An upper end 42 of the second sections 38 is coupled to and extends downwardly from an upper end 44 of the first sections 36. The first sections 36 may be positioned on opposite ends 46, 48 of the rear wall 20. The second sections 38 may have a greater height than the first sections 36 such that a lower edge 50 of the second sections 38 extends lower than the bottom ends 40 of the first sections 36.

An inner surface 52 of the arms 34 form a receiving slot 54 configured for positioning onto a vehicle door frame 56 such that the second sections 38 are positioned within a window cavity 58 of the vehicle and the first sections 36 are positioned against an inside surface 60 of the vehicle door frame 56. In this manner, the arms 34 prevent the pet 28 from pressing the window and/or door controls. The arms 34 also prevent the pet 28 from leaping out of the window and from damaging a top of the vehicle door frame 56. The arms 34 may be constructed from steel or like material. Each of the arms 34 may have a width between approximately 5.0 centimeters and 8.0 centimeters. The top surface 14 of the platform 12 may be spaced from a top end of the window cavity 58 a distance between approximately 10.0 centimeters and 14.0 centimeters. A distance between the second sections 38 and the bottom ends 40 of the first sections 36 may be between approximately 11.0 centimeters and 14.0 centimeters.

A connector 84 may removably couple each of the arms 34 to the platform 12. Each of the connectors 84 extends through an associated one of the first sections 36 and the rear wall 20. The connectors 84 are positioned proximate the bottom end 40 of the first sections 36.

A pouch 62 may be removably coupled to and extend downwardly from the front wall 18. The pouch 62 comprises a back panel 64 and a perimeter wall 66 coupled to and extending outwardly from a front side 68 of the back panel 64. The back panel 64 and the perimeter wall 66 define an interior 70 of the pouch 62 configured to receive a plurality of objects 72 to be stored, such as treats, toys, or the like. A top edge 74 of the back panel 64 may be spaced from a top edge 76 of the perimeter wall 66. The top edge 76 of the perimeter wall 66 defines an access opening into the interior 70 of the pouch 62. A plurality of fasteners 78 may removably couple the pouch 62 to the platform 12. The fasteners 78 are positioned proximate the top edge 74 of the back panel 64.

A ring 80 may be coupled to the platform 12 wherein the ring 80 is configured for coupling to a pet leash 82 to restrict movement of the pet 28 when the leash 82 is attached to both the pet 28 and the ring 80. The ring 80 may be positioned proximate the front wall 18 and extend upward from the top surface 14.

In use, as stated above and shown in the Figures, the arms 34 are positioned within the window cavity 58 of the vehicle. The pad 30 is positioned on the top surface 14 to inhibit the pet from sliding around inside the vehicle when the front legs 26 of the pet 28 are supported on the pad 30. The pet 28 is tied to ring 80 using a leash 82. Objects 72 such as toys, treats, or the like are stored in the pouch 62 and retrieved as needed. In this manner, the assembly 10 prevents the pet 28 from leaping outwardly through the window, from pressing the window and/or door controls, and from damaging a top of the vehicle door frame 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all, suitable modifications and equivalents may be resorted to, falling within the scope of the disclosure.

We claim:

1. A vehicular pet platform assembly comprising:
    a platform having a top surface, a bottom surface, a front wall, a rear wall, and a pair of lateral walls attached to and extending between said front and rear walls, said platform being configured to support front legs of a pet;
    a pair of rigid arms coupled to and extending outwardly from said rear wall, an inner surface of said arms forming a receiving slot configured for positioning onto a door frame of a vehicle such that each of said arms are positioned within a window cavity of the vehicle and against an inside surface of the door frame; and
    a pouch coupled to and extending downwardly from said front wall, said pouch comprising a back panel and a perimeter wall coupled to and extending outwardly from a front side of said back panel, said back panel and said perimeter wall defining an interior of said pouch configured to receive a plurality of objects to be stored, a top edge of said perimeter wall defining an access opening into said interior of said pouch.

2. The assembly of claim 1, further comprising:
    each of said arms comprising an arcuate first section and a planar second section, an upper end of said second sections being coupled to and extending downwardly from an upper end of said first sections; and
    wherein said second sections are positioned within the window cavity of the vehicle and said first sections are positioned against the inside surface of the door frame.

3. The assembly of claim 2, further comprising said first sections being positioned on opposite ends of said rear wall.

4. The assembly of claim 2, further comprising a bottom end of said first sections being aligned with said bottom surface.

5. The assembly of claim 2, further comprising said second sections having a greater height than said first sections such that a lower edge of said second sections extends lower than bottom ends of said first sections.

6. The assembly of claim 5, further comprising a top edge of said back panel being spaced from said top edge of said perimeter wall.

7. The assembly of claim 5, further comprising:
    said pouch being removably coupled to said front wall; and
    a plurality of fasteners removably coupling said pouch to said platform, said fasteners being positioned proximate a top edge of said back panel.

8. The assembly of claim 2, further comprising:
    said arms being removably coupled to said rear wall; and
    a pair of connectors removably coupling said arms to said platform, each of said connectors extending through an associated one of said first sections and said rear wall, said connectors being positioned proximate bottom ends of said first sections.

9. The assembly of claim 1, further comprising a pad being positionable on said top surface.

10. The assembly of claim 9, further comprising said pad being comprised of an elastomeric foam material.

11. The assembly of claim 1, further comprising a top edge of said back panel being spaced from said top edge of said perimeter wall.

12. The assembly of claim 1, further comprising:
    said pouch being removably coupled to said front wall; and
    a plurality of fasteners removably coupling said pouch to said platform, said fasteners being positioned proximate a top edge of said back panel.

13. The assembly of claim 1, further comprising a ring coupled to said platform wherein said ring is configured for coupling to a pet leash to restrict movement of the pet when the leash is attached to the pet and said ring, said ring being positioned proximate said front wall and extending upwardly from said top surface.

14. A vehicular pet platform assembly comprising:
    a platform having a top surface, a bottom surface, a front wall, a rear wall, and a pair of lateral walls attached to and extending between said front and rear walls, said platform being configured to support front legs of a pet;
    a pair of rigid arms removably coupled to said rear wall, each of said arms comprising an arcuate first section and a planar second section, a bottom end of said first sections being aligned with said bottom surface, an upper end of said second sections being coupled to and extending downwardly from an upper end of said first sections, said first sections being positioned on opposite ends of said rear wall, said second sections having a greater height than said first sections such that a lower edge of said second sections extends lower than said bottom ends of said first sections, an inner surface of said arms forming a receiving slot configured for positioning onto a vehicle door frame such that said second sections are positioned within a window cavity of the vehicle and said first sections are positioned against an inside surface of the vehicle door frame;
    a pair of connectors removably coupling said arms to said platform, each of said connectors extending through an associated one of said first sections and said rear wall, said connectors being positioned proximate said bottom end of said first sections;
    a pad positionable on said top surface, said pad having a size such that said pad is spaced from a perimeter edge of said top surface, said pad being comprised of an elastomeric foam material;
    a pouch removably coupled to and extending downwardly from said front wall, said pouch comprising a back panel and a perimeter wall coupled to and extending outwardly from a front side of said back panel, said back panel and said perimeter wall defining an interior of said pouch configured to receive a plurality of objects to be stored, a top edge of said back panel being spaced from a top edge of said perimeter wall, said top edge of said perimeter wall defining an access opening into said interior of said pouch;

a plurality of fasteners removably coupling said pouch to said platform, said fasteners being positioned proximate said top edge of said back panel; and a ring coupled to said platform wherein said ring is configured for coupling to a pet leash to restrict movement of the pet when the leash is attached to the pet and said ring, said ring being positioned proximate said front wall and extending upwardly from said top surface.

15. A vehicular pet platform assembly comprising:

a platform having a top surface, a bottom surface, a front wall, a rear wall, and a pair of lateral walls attached to and extending between said front and rear walls, said platform being configured to support front legs of a pet; and a pair of rigid arms coupled to and extending outwardly from said rear wall, each of said arms comprising an arcuate first section and a planar second section, an upper end of said second sections being coupled to and extending downwardly from an upper end of said first sections, said second sections having a greater height than said first sections such that a lower edge of said second sections extends lower than bottom ends of said first sections, an inner surface of said arms forming a receiving slot configured for positioning onto a door frame of a vehicle such that said second sections are positioned within a window cavity of the vehicle and said first sections are positioned against an inside surface of the door frame.

16. The assembly of claim 15, further comprising said bottom ends of said first sections being aligned with said bottom surface.

17. The assembly of claim 15, further comprising:

said arms being removably coupled to said rear wall; and a pair of connectors removably coupling said arms to said platform, each of said connectors extending through an associated one of said first sections and said rear wall, said connectors being positioned proximate bottom ends of said first sections.

18. The assembly of claim 15, further comprising a pad being positionable on said top surface.

19. The assembly of claim 18, further comprising said pad being comprised of an elastomeric foam material.

20. The assembly of claim 18, further comprising a ring coupled to said platform wherein said ring is configured for coupling to a pet leash to restrict movement of the pet when the leash is attached to the pet and said ring, said ring being positioned proximate said front wall and extending upwardly from said top surface.

\* \* \* \* \*